United States Patent [19]

Ruiz et al.

[11] 4,269,640

[45] May 26, 1981

[54] PRECISION HEAT FORMING OF TETRAFLUOROETHYLENE TUBING

[76] Inventors: Robert A. Frosch, Administrator of the National Aeronautics and Space Administration, with respect to an invention of W. V. Ruiz, Yorba Linda; C. S. Thatcher, Fullerton, both of Calif.

[21] Appl. No.: 113,015

[22] Filed: Jan. 18, 1980

[51] Int. Cl.³ ............................................. B29C 27/12
[52] U.S. Cl. ....................................... 156/84; 156/85; 156/86; 264/230; 264/342 R
[58] Field of Search ............................ 156/84, 85, 86; 264/230, 342 R

[56] References Cited

U.S. PATENT DOCUMENTS

| 3,567,259 | 3/1971 | Benson et al. | 264/230 |
| 3,856,905 | 12/1974 | Dawson | 264/230 |
| 3,967,991 | 7/1976 | Shimeno et al. | 156/85 |
| 4,098,631 | 7/1978 | Stryjewski | 264/230 |
| 4,110,396 | 8/1978 | Reynolds | 264/230 |

Primary Examiner—Caleb Weston

Attorney, Agent, or Firm—Marvin J. Marnock; John R. Manning; Marvin F. Matthews

[57] ABSTRACT

The object of this invention is to provide the method of altering the size of tetrafluoroethylene tubing which is only available in limited combination of wall thicknesses and diameter. The method includes the steps of sliding the tetrafluoroethylene tubing (12) onto an aluminum mandrel (20) and clamping the ends of the tubing to the mandrel by means of clamps (24). The tetrafluoroethylene tubing and mandrel are then placed in a supporting coil (25). The supporting coil with the mandrel and tetrafluoroethylene tubing are then positioned in a insulated steel pipe (28). The steel pipe is normally covered with a fiber glass insulator to smooth out temperature distribution therein. The entire structure is then placed in an oven which heats the tetrafluorethylene tubing which is then shrunk by the heat to the outer dimension of the aluminum mandrel. After cooling the aluminum mandrel is removed from the newly sized tetrafluoroethylene tubing by a conventional chemical milling process.

4 Claims, 3 Drawing Figures

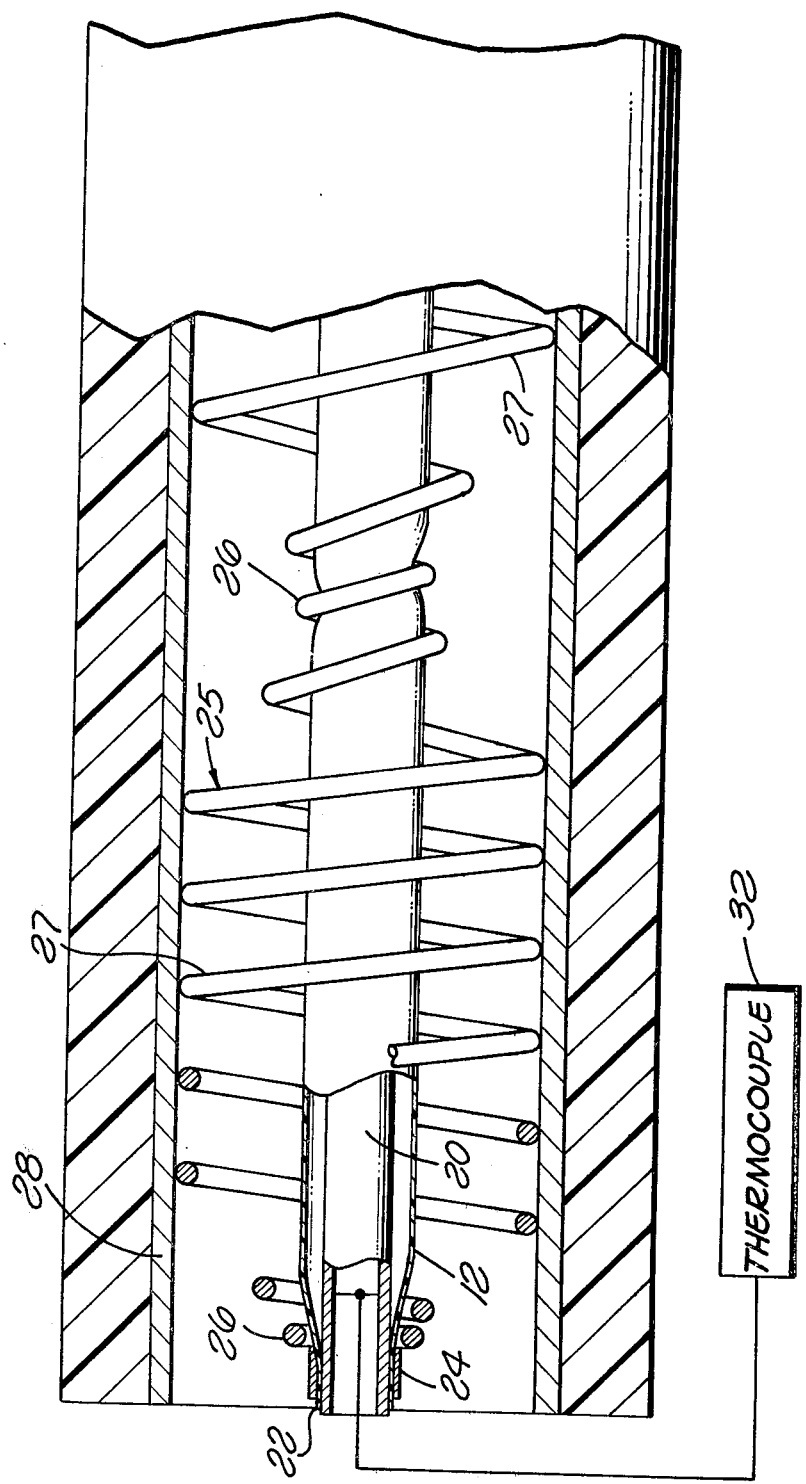

PRECISION HEAT FORMING OF TETRAFLUOROETHYLENE TUBING

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; U.S.C. 2457).

DESCRIPTION

Technical Field

Our invention relates to the method of forming tetrafluoroethylene tubing and particularly to forming the tetrafluoroethylene tubing to a desired size from commercially available size tetrafluoroethylene tubing.

In forming tetrafluoroethylene tubing, it is necessary that the tubing be made as thin as possible so that it is not stiff, as thick tetrafluoroethylene tubing becomes brittle and would break when used in certain sealing applications. Prior art seals, such as rubber, when subjected to certain temperature and other conditions, become hard and brittle and cannot be compressed, resulting in cracking of the rubber. In certain applications, the seal must be subjected to a wide variety of temperature ranges, as from minus 129 degrees Celsius to plus 176 degrees Celsius. Such temperature ranges are typically encountered in the payload cargo door of an aircraft and conventional sealing materials have been found to be almost useless.

BACKGROUND ART

The prior art, U.S. Pat. Nos. 3,567,259; 3,856,905; 3,967,991; 4,098,631; and 4,110,396 while relating to heat forming of tetrafluoroethylene tubing do not in any way recognize the problem embraced by the subject disclosure nor offer a solution to the problem.

DISCLOSURE OF THE INVENTION

In accordance with the present invention, we provide a method of altering the size of tetrafluoroethylene tubing which is ordinarily only commercially available in a limited combination of wall thicknesses and diameters, resulting from the extrusion processes in manufacture. By the process of the present invention, standard tetrafluoroethylene tubing can be altered in size to achieve dimensions not heretofore obtainable. The process includes the steps of supporting the tetrafluoroethylene tubing to be shrunk on a mandrel, placing the mandrel in a supporting coil, suspending the coil centrally in a heavy wall steel pipe which is then heated in an oven. The temperatures of the mandrel in the oven are monitored to achieve the desired tubing dimensions without splitting of the tetrafluoroethylene tubing.

BRIEF DESCRIPTION OF THE DRAWINGS

The details of our invention are described in connection with the accompanying drawings, in which

FIG. 3 is a partial cross-sectional view illustrating the arrangement for heating the tetrafluoroethylene tubing so that it can be shrunk to the desired size of FIG. 1.

BEST MODE FOR CARRYING OUT THE INVENTION

Figure 1:
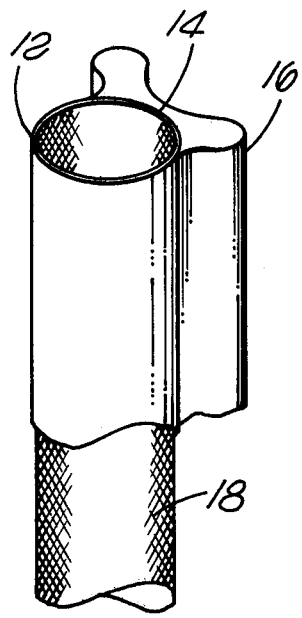
FIG. 1 is a partial perspective view of the tetrafluoroethylene tubing shown as part of the seal of the final product.

Referring now to the drawing there is shown in FIG. 1, the tetrafluoroethylene tubing 12 constructed in accordance with the process of the present invention. As illustrated therein, the tubing 12 is bonded along an edge 14 to a base 16 typically formed of silicon rubber. A spring 18 is positioned within the tubing 14. The spring 18 is inserted into the tubing after the desired size of the tubing has been formed by the process of the present invention. The spring 18 provides the desired stiffness required in a sealing operation.

Typically, the present process enables a conventionally sized tetrafluoroethylene tubing to be sized so that the desired size spring 18 can be positioned therein. The free edges of the tubing 12 which are not bonded to the base 16 provides a sealing surface when a door (not shown) is positioned against the tubing 12. In one application conventional tetrafluoroethylene tubing having a diameter of 3.175 centimeters and a thickness of 0.010 centimeters is shrunk so that the final product has a 1.9 centimeters diameter and a thickness of 0.02 centimeters.

Figure 2:
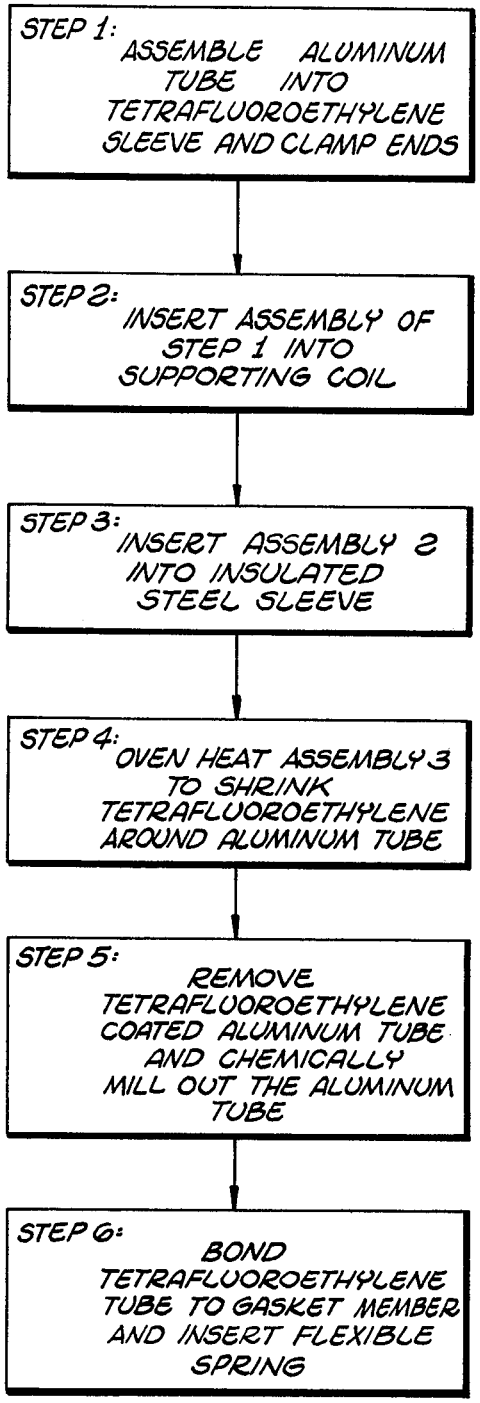
FIG. 2 is a block diagram describing the steps used in forming the tetrafluoroethylene tubing of FIG. 1 to its desired size.

Referring now to the steps of the process as illustrated in FIG. 2 and the structure of FIG. 3, conventional tetrafluoroethylene tubing 12 is placed over an aluminum mandrel 20. The tetrafluoroethylene tubing 12 has a diameter much greater than the outer diameter of the aluminum mandrel 20 as can be clearly seen in FIG. 3. The ends 22 of the tubing 12 are clamped by means of clamps 24 to the respective ends of the aluminum mandrel 20 to prevent actual longitudinal shrinking of the tubing 12 during the process. The clamped tubing 12 and the mandrel 20 are then placed into a supporting coil 25. The supporting coil 25 is made of continuous wound heavy aluminum or steel wire and is formed of a plurality of small diameter coil sections 26 at the ends of the coil structure. The small diameter coils also are used to interconnect large diameter coil sections 27. The small coil section inner diameter is sufficient to provide a loose fit of the tubing 12 and mandrel 20.

Where the aluminum mandrel 20 has a 1.9 centimeter outer diameter aluminum hollow tube, the tubing 12 is initially of 3.175 centimeters and is intended to be shrunk to the outer diameter of the aluminum mandrel. The large coil section 27 is of approximately 10 centimeters outer diameter. The supporting coil 25 and the clamped tubing 12 are then inserted into an approximately 10 centimeter inner diameter steel pipe 28. The large coil section 27 positions the clamped tubing in the pipe 28.

The steel pipe 28 normally is covered with an insulator such as fiber glass so as to smooth out temperature distribution in the pipe. A thermocouple 32 is normally connected so as to measure the temperature of the mandrel 20 during the tube shrinking process. The entire structure of FIG. 3 is then placed in an oven and heated from 15 minutes to approximately ½ hour at a temperature of approximately 330 degrees to 354 degrees Celsius. After the heating process has been completed and the tubing 12 has shrunk to an outer diameter of the aluminum mandrel 20, the supporting coil 25 together with the aluminum mandrel 20 are removed as a unit from the steel pipe 28. With the wire supporting coil 25 and the aluminum mandrel 20 removed from the oven, a fiber glass bolt of cloth is placed around the supporting coil 25 to enable the aluminum mandrel 20 and the newly shrunk surrounding tubing 12 to cool slowly.

Once the aluminum mandrel 20 and the tubing 12 have cooled, the aluminum mandrel can be removed from the interior of the shrunk tubing 12 by chemical milling. Typically, the chemical milling process utilizes a sodium hydroxide solution to remove the aluminum mandrel 20 as is conventional and forms no part of this invention. A solid rubber sleeve (not shown) is then inserted into the tubing 12. The rubber sleeve normally has the same dimensions as the spring 13 of FIG. 1. The tubing 12 is then bonded along its edge 14 to the base 16 as shown in FIG. 1. Finally, the rubber sleeve is removed and the spring 18 inserted in its place.

The foregoing temperature and shrinking process achieves the desired dimension of the shrunk tubing 12 without splitting thereof.

While tetrafluoroethylene tubing can be extruded by special processes to a limited combination of wall thicknesses and diameter, the present process enables wall-/diameter combinations not amenable to extrusion which must be obtained by heat expansion alone or by heat expansion and subsequent shrinking if precise sizing and/or forming to special contours is required.

The foregoing and other advantages are obvious to those skilled in the art of precision heat forming of tetrafluoroethylene materials.

We claim:

1. A method for altering the size of tetrafluoroethylene tubing without splitting comprises the steps of:
   (a) sliding tetrafluoroethylene tubing onto an aluminum mandrel and clamping the ends of the tubing to the mandrel;
   (b) inserting said tetrafluoroethylene tubing on said aluminum mandrel into a supporting coil;
   (c) inserting said coil with said tetrafluoroethylene tubing on said aluminum mandrel into an insulated steel pipe forming an assembly;
   (d) heating said assembly in an oven to a temperature in the range of approximately 330 to 354 degrees celsius for approximately 15 to 30 minutes to shrink said tetrafluoroethylene tubing to the size of said aluminum mandrels;
   (e) removing said tetrafluoroethylene tubing and aluminum mandrel and said coil from said pipe and allowing the tetrafluoroethylene tubing to cool slowly; and
   (f) removing said tetrafluoroethylene tubing from said mandrel.

2. The method in accordance with claim 1 wherein said coil with said tetrafluoroethylene tubing and said aluminum mandrel are removed from said oven after shrinking said tetrafluoroethylene tubing to the size of said mandrel and further slowly cooling said tetrafluoroethylene tubing by wrapping said coil in a fiber glass bolt of cloth.

3. The method in accordance with claim 1 wherein said tubing is bonded along an edge to a base of silicon rubber after removal of said tubing from said aluminum mandrel.

4. The method in accordance with claim 1 wherein the mandrel is removed from the tetrafluoroethylene by chemical milling.

* * * * *